(12) United States Patent
Laine (10) Patent No.: US 9,862,413 B2
(45) Date of Patent: Jan. 9, 2018

(54) METHOD FOR ASSISTING THE REVERSAL OF AN ARTICULATED VEHICLE

(71) Applicant: VOLVO TRUCK CORPORATION, Göteborg (SE)

(72) Inventor: Leo Laine, Härryda (SE)

(73) Assignee: Volvo Truck Company, Göteborg (SE)

( * ) Notice: Subject to any disclaimer, the term of this patent is extended or adjusted under 35 U.S.C. 154(b) by 67 days.

(21) Appl. No.: 14/891,342

(22) PCT Filed: May 15, 2013

(86) PCT No.: PCT/SE2013/000074
§ 371 (c)(1),
(2) Date: Nov. 14, 2015

(87) PCT Pub. No.: WO2014/185828
PCT Pub. Date: Nov. 20, 2014

(65) Prior Publication Data
US 2016/0114831 A1 Apr. 28, 2016

(51) Int. Cl.
*B62D 13/06* (2006.01)
*B62D 15/02* (2006.01)

(52) U.S. Cl.
CPC ......... *B62D 13/06* (2013.01); *B62D 15/0285* (2013.01)

(58) Field of Classification Search
CPC . B62D 13/06; B62D 15/0285; B60T 2230/08; B60Y 2200/148
See application file for complete search history.

(56) References Cited

U.S. PATENT DOCUMENTS

| | | |
|---|---|---|
| 2004/0148100 A1 | 7/2004 | Kang |
| 2006/0111820 A1 | 5/2006 | Goetting et al. |

(Continued)

FOREIGN PATENT DOCUMENTS

| | | |
|---|---|---|
| AU | 769593 B2 | 1/2004 |
| CN | 102587237 A | 7/2012 |

(Continued)

OTHER PUBLICATIONS

Chinese Official Action (dated Feb. 3, 2017) for corresponding Chinese App. 201380076377.9.
Japanese Official Action (translation) (dated Feb. 8, 2017) for corresponding Japanese App. 2016-513898.
International Search Report (dated Feb. 28, 2014); for corresponding International App. PCT/SE2013/000074.
International Preliminary Report on Patentability (dated May 21, 2015) for corresponding International App. PCT/SE2013/000074.
Sundberg, S. "Swept areas and collision detection with application to autonomous vehicles" 2005 Master's thesis Lulea univeristy of technology, ISBN:1402-1617; Chapters 1, 3.2, 4.

(Continued)

*Primary Examiner* — Dale Moyer
(74) *Attorney, Agent, or Firm* — WRB-IP LLP (57) ABSTRACT

A method for assisting the reversal of an articulated vehicle includes recording a predefined number of positions for a first articulated vehicle for a specified path, recording the articulation angle of each articulation joint of the articulated vehicle at the predefined number of positions, recording the heading for the first articulated vehicle at the predefined number of positions, saving the recorded values for the specified path in a memory, calculating the swept area of the first vehicle for the specified path by using the recorded values and size information of the articulated vehicle, and using the swept area to control the steering of the articulated vehicle when reversing the articulated vehicle along the specified path, such that the articulated vehicle does not extend outwards of the swept area during the reversal. The area covered by the articulated vehicle when traveling forwards can be used to control the steering of the vehicle when reversing along the same path, such that the articulated vehicle substantially does not extend outward the swept area when reversing. In this way, an assisted reversing functionality can be used, which allows for a faster and more efficient reversing of the articulated vehicle, and at the same time allows for an improved comfort for the driver.

18 Claims, 3 Drawing Sheets

(56) References Cited

U.S. PATENT DOCUMENTS

| | | | |
|---|---|---|---|
| 2007/0027581 A1 | 2/2007 | Bauer et al. | |
| 2007/0090688 A1* | 4/2007 | Haemmerling | ........ B62D 15/00 303/7 |
| 2008/0009990 A1 | 1/2008 | Katoh et al. | |
| 2008/0312792 A1 | 12/2008 | Dechamp | |
| 2011/0001825 A1 | 1/2011 | Hahnstefan | |
| 2012/0271515 A1 | 10/2012 | Rhode et al. | |
| 2012/0271522 A1 | 10/2012 | Rupp et al. | |
| 2013/0006472 A1 | 1/2013 | McClain et al. | |
| 2013/0035821 A1 | 2/2013 | Bonne et al. | |

FOREIGN PATENT DOCUMENTS

| | | |
|---|---|---|
| CN | 102693929 A | 9/2012 |
| CN | 103085809 A | 5/2013 |
| DE | 102005051804 A1 | 5/2007 |
| DE | 102008043675 A1 | 5/2012 |
| EP | 2631729 A1 | 8/2013 |
| JP | 2012145998 | 8/2012 |
| WO | 2006094519 A3 | 9/2006 |
| WO | 2010149856 A2 | 12/2010 |

OTHER PUBLICATIONS

Official Action (dated Mar. 29, 2017) from corresponding European App. 13 884 656.3.

* cited by examiner

METHOD FOR ASSISTING THE REVERSAL OF AN ARTICULATED VEHICLE

BACKGROUND AND SUMMARY

The present invention relates to a method for assisting the reversal of an articulated vehicle by determining a swept area for a vehicle combination, which is used when reversing the vehicle. The method is especially suited for use with a reverse assistance function.

Professional drivers of heavy trucks with trailers often have to manually perform path planning and path following with high precision when rearranging the vehicle combination during low speed. This could for example be when loading or unloading the vehicle, docking at loading bays, parking in tight spaces, coupling trailers or changing swap bodies. During low speed manoeuvres with a long vehicle combination, even an experienced driver must be concentrated, and it may well be both stressful and time consuming.

Reversing a commercial heavy articulated vehicle is a challenging task even for an experienced driver. The driver must concentrate on controlling the steering wheel angle of the vehicle in order to keep the vehicle combination's articulation angles correct such that the desired path can be followed during reversing. Due to this, there is a risk that less attention is given to safety issues through observations of the surrounding around the vehicle to avoid collisions with pedestrians, fixed and moving obstacles. One such situation may be when the driver is maneuvering the vehicle combination with low speed before the delivery of goods or when he has driven into a narrow and tricky road/street by mistake and needs to reverse the vehicle combination back out from this narrow road/street. Another situation could be a timber truck combination which drives into an incorrect small forest road, where turning the vehicle combination around is not possible and reversing the vehicle combination is necessary.

Another typical situation is when the driver is at a known cargo central and wants to start a low speed rearranging procedure to line up with the docking bay. This procedure may have been done by the driver several times before, i.e. the driver will have to manually reverse into the docking station by himself time after time. This means that the driver has to put a lot of effort into using the steering wheel to achieve a significant steer input, especially during reversing since several articulation joints make the vehicle combination hard to control. This will also increase the risk of work related injury of aching shoulders and back which is common for commercial heavy truck drivers.

One way to reduce the work load and stress on the driver when reversing is to provide the truck with a reverse assistance function. The reverse assistance function will assist the driver when reversing the vehicle combination, thereby allowing the driver to focus on supervising the manoeuvre and to monitor the surrounding of the vehicle. The reverse assistance will reduce the time spent during reversing, e.g. the time spent to dock a loading platform, which will increase the productivity of the vehicle and the precision of the docking operation. Further, it may also reduce accidents that could damage both the vehicle combination and surrounding objects since the driver can be fully concentrated on supervising the vehicle motion rather than planning and executing the reversing of the vehicle combination. Another advantage is that also inexperienced drivers will be able to perform difficult low speed maneuvering tasks.

Reverse assistance is becoming increasingly popular by passenger cars, where the control task of the reverse assistant function often uses separate controllers for the steering and for the speed. The driver of the vehicle may e.g. control the reverse speed of the vehicle and the control system of the vehicle controls the steering of the vehicle when parallel parking. The system comprises a speed limit such that the driver can only move the vehicle below the set speed limit. In this way, the steering actuator will be able to follow the desired path and the driver will have time to observe the surrounding.

For a reverse assistance system that is to be used with a heavy vehicle such as a truck, other features are desirable. With a heavy vehicle, parallel parking is not a primary purpose. Instead, reversing over longer distances, e.g. for docking to a loading platform, or for reversing through sharp turns are useful features. Further, the reverse assistance system should also be adapted to handle a vehicle combination comprising a truck and a trailer.

One issue with a reverse assistance function is to keep track of the surrounding of the vehicle combination when reversing. Even if the vehicle is provided with rear mirrors and a back-up camera, there will be areas close to the vehicle that are hidden from the view of the driver, especially for a vehicle having more than one articulation joint. It is of course possible to install more cameras or proximity sensors on the trailers, but the integration of different trailers with the control system of the towing vehicle would be rather complicated. Such a solution could work for a dedicated truck-trailer combination.

It is thus of advantage to provide a method for improving the safety when reversing an articulated vehicle.

It is desirable to provide a method for determining a swept area of a vehicle for a specified path, and to use the swept area when reversing the vehicle along the specified path.

In a method for assisting the reversal of an articulated vehicle, the steps of recording a predefined number of positions for a first articulated vehicle for a specified path, recording the articulation angle of each articulation joint of the articulated vehicle at the predefined number of positions, recording the heading for the first articulated vehicle at the predefined number of positions, saving the recorded values for the specified path in a memory, calculating the swept area of the first articulated vehicle for the specified path by using the recorded values and size information of the articulated vehicle, and using the swept area to control the steering of the articulated vehicle when reversing the articulated vehicle along the specified path, such that the articulated vehicle does not extend outwards of the swept area during the reversal are comprised.

By this first embodiment of the method, the method will first record a predefined number of positions for a first vehicle for a specified path, thereby defining the traveled path. The specified path may e.g. be the last part of a traveled route, or may be a path that has been traveled at an earlier moment. The specified path is saved in a memory. Thereafter, the swept area for the traveled path is calculated. The swept area is the total area covered by a projection of the vehicle on the ground, i.e. a corridor in which the vehicle has been traveling. In order to be able to calculate the swept area, the control unit of the vehicle records values for the articulated vehicle during travel along the specified path and uses stored vehicle parameters for the complete articulated vehicle including equivalent wheel bases, length and width of the towing vehicle and the towed vehicles.

In this way, the articulated vehicle can use the swept area when reversing and the steering of the articulated vehicle can be controlled such that the articulated vehicle does not extend outside of the swept area. It may however be unpractical to control the steering such that the vehicle does not extend outside of the swept area. Due to e.g. the speed of the steering actuator, the speed of the vehicle and noise and resolution of the used sensors, the vehicle may extend outside the swept area to a certain extent. By adding a tolerance band to the swept area, a modified swept area is obtained, inside which the articulated vehicle can remain during reversal. Theoretically, it is possible to set the tolerance band to zero, but a tolerance band in the order of less than 20 cm is of advantage. In this way, the modified swept area is used to control the steering of the vehicle when reversing the vehicle along the specified path, such that the vehicle does not extend outwards of the modified swept area during the reversal.

In this way, the vehicle combination will be controlled such that it is substantially within the swept area during the reversal of the specified path. If the specified path is the last path traveled by the vehicle combination, the driver can be ensured that he can reverse along the specified path without running into any obstacles, since he knows that he has just traveled the same path. Has the driver e.g. driven into a narrow road by mistake, he can reverse along the same road and be confident that he is within the road at all times. This saves time and relieves the driver of a lot of stress, both from the reversing itself and from keeping the vehicle combination on the road. Especially for a relatively long and/or curved road, this is of advantage.

Preferably, the projection of the vehicle combination in the tolerance band of the modified swept area is minimized during the reversal. Depending on different parameters, such as reversal speed, the steering actuator, the used sensors etc, the projection of the vehicle combination can be allowed to extend more or less in the tolerance band. It is preferred to minimize the total area projected in the tolerance band during the reversal since this will give a smoother reversal and a higher security. The width of the tolerance band is set such that a reasonable reversing speed can be used but where the width of the tolerance band is narrow enough to give a good tolerance to obstacles around the vehicle.

In a development of the method, the swept area is saved in a memory and used at a later moment, when the articulated vehicle combination is to reverse into a known location. This may e.g. be a loading dock, into which the driver reversed the vehicle the first time. When driving out of the loading dock, the path is saved. The next time the vehicle is to visit the same loading dock, the reverse assistance function of the vehicle can use the stored path to reverse into the loading dock. The swept area can either be stored in a memory in the specific vehicle or in a central database where different vehicles can access the information. In this way, also vehicles that have not been at a specific position before can use a swept area for a reversal.

In a development of the method, the swept area of a first articulated vehicle combination can be used to assist a second articulated vehicle combination having a different wheel base to reverse along a specified path. It may e.g. be that a second vehicle combination is going to reverse to the same loading dock. The swept area of the first vehicle combination can in this case be used by the second vehicle to reverse into the loading dock. If the difference between the first and the second vehicle combination is relatively large, such that a relatively large tolerance band is needed to assist the reversal of the second vehicle combination, a message may be given to the driver that he should be careful and pay extra attention. This may e.g. be the case if the second vehicle is much wider or longer than the first vehicle. However, normally, the width of different vehicle combinations do not differ much since the width of heavy vehicles is well specified and governed by legislation.

In a development of the method, different swept areas at the same location can be combined in order to create an aggregate swept area. This aggregate swept area may comprise two or more swept areas from previous paths at the same location. Normally, a driver does not always use exactly the same path at e.g. a loading dock. At a normal loading dock, the unloading position may e.g. vary sideways with 1 meter or more. After several vehicles have unloaded at the same loading dock, different swept areas may have been saved for the same location. By combining these swept areas, a wider allowed corridor for the vehicle combination is provided. In such a case, it may not be necessary to use a tolerance band at all.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims. The term vehicle used on its own may mean articulated vehicle or vehicle combination. If a specific vehicle in the vehicle combination is meant, towing vehicle or towed vehicle is used.

Figure 1:
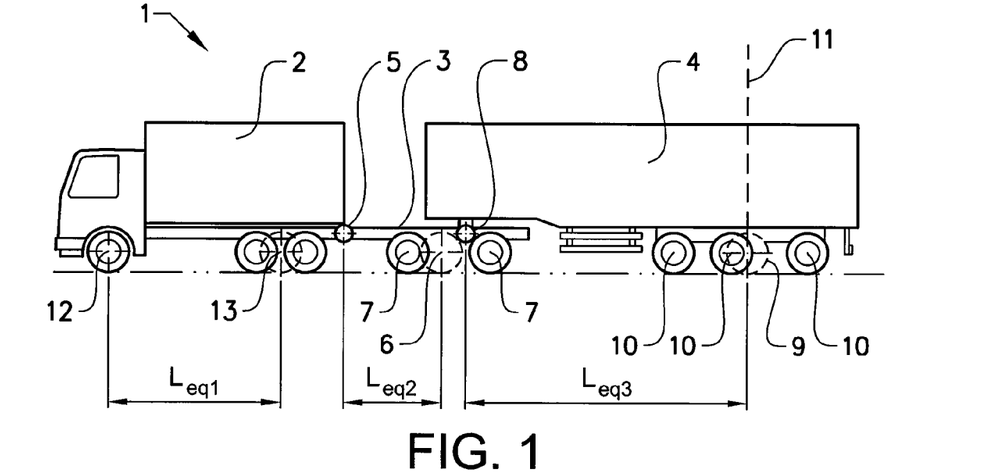
FIG. 1 shows a schematic vehicle combination comprising a towing vehicle and two towed trailers.

FIG. 1 shows a schematic articulated vehicle combination 1 comprising a towing vehicle 2 and two towed vehicles 3, 4. The towing vehicle may be a regular truck adapted for commercial highway use or a tractor having a fifth wheel, but may also be an off-road truck or a bus. The first towed vehicle or trailer 3 is in the shown example a dolly having a drawbar connected to the trailer coupling of the truck. The dolly is provided with two wheel axles 7. The second towed vehicle or trailer 4 is a semitrailer, which is provided with a kingpin 8 that is connected to the fifth wheel of the dolly. This example shows a common type of a longer vehicle combination, but it is also possible to use other types of vehicle combinations having other types of towing vehicles and other types and numbers of towed vehicles. Different vehicle combinations may include a truck with a regular trailer, a truck with a centre axle trailer, a truck with a dolly and a semitrailer, a tractor with a semitrailer, a tractor with a B-link and a semitrailer, a tractor with a semitrailer and a regular trailer or a tractor with a semitrailer dolly and a semitrailer.

A regular trailer having both a front axle and one or several rear axles can be modelled as two towed trailers. The first towed trailer comprises the drawbar and the first axle and the effective wheel base extends from the drawbar connection to the front axle, or the virtual front axle if the trailer is provided with more than one front axle. The second towed trailer comprises the trailer body and the rear axle or axles, where the effective wheel base extends from the pivot point between the trailer body and the first axle to the virtual rear axle of the trailer. The vehicle combination may also be an articulated bus having one or two pivoting joints.

The towing vehicle is provided with an automatic reverse assistance function, in which the steering of the vehicle combination is automated during reversing and where the speed of the vehicle combination may be controlled by the driver. The automatic reverse assistance function is adapted to steer the vehicle when reversing along the traveled path.

In the shown vehicle combination, the effective wheel base Leq1 of the towing vehicle, i.e. the truck, is the length from the front axle 12 to the virtual axle 13 of the truck. The effective wheel base Leq2 of the first towed vehicle, i.e. the dolly, is the length from the drawbar connection to the virtual axle 6 of the dolly. The effective wheel base Leq3 of the second towed trailer extends from the king pin 8 to the to the virtual rear axle 9 of the trailer 4.

Figure 2:
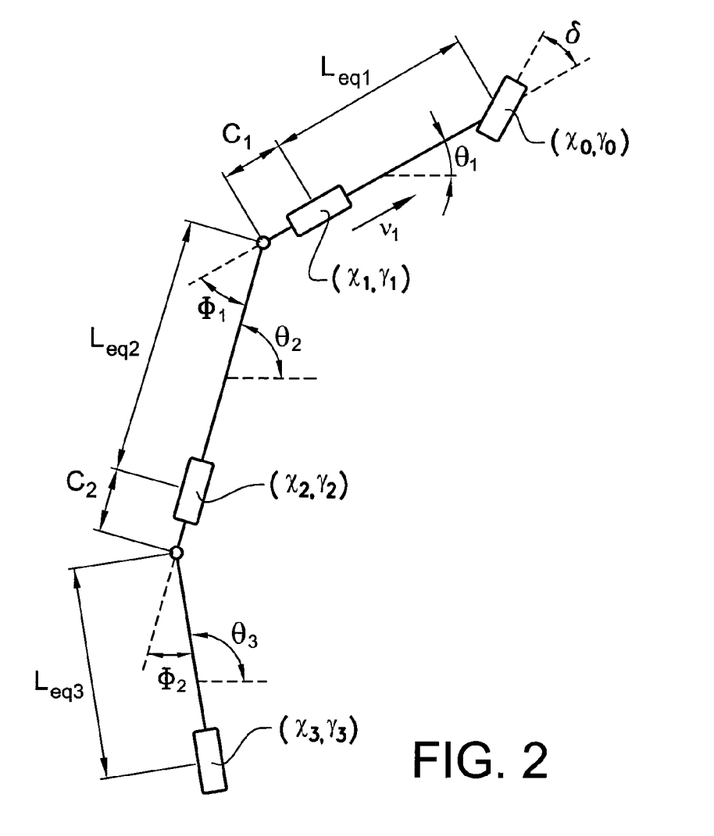
FIG. 2 shows an example of a linear vehicle model for a vehicle combination.

To simplify the calculations, a linear vehicle model is used to represent the vehicle combination. FIG. 2 shows an example of a well-known vehicle model of a truck-dolly-semitrailer vehicle combination. The vehicle combination contains three rigid bodies attached by joints which have one rotational degree of freedom. None of the towed vehicles in this example have any steered axles. In the linear vehicle model, the effective wheelbase for each towed trailer is used for the calculations. The effective wheelbase for each vehicle can either be measured in advance and stored in a memory or may be estimated by recording a number of measures when the vehicle combination is driven forwards.

When the articulated vehicle travels forwards along a path, the position of the articulated vehicle is recorded with a predefined rate. The predefined rate may depend on distance or on time. In this way, a position is recorded with a specific distance interval or a specific time interval. For a specified path, this will amount in a predefined number of positions for the first vehicle. The recorded position may be any selected position of the articulated vehicle. In the shown example, the position of the virtual rear axle 9 of the second trailer is used. The heading of the articulated vehicle is simultaneously recorded at the same position. The articulation angle of each articulation joint of the articulated vehicle is also recorded simultaneously at the same position. Alternatively, the position of each vehicle in the vehicle combination may be recorded instead of one position of the vehicle combination and the heading of the vehicle combination. The specified path may also be recorded and saved at an earlier moment. It is e.g. possible to store the path for a vehicle combination when the vehicle reverses to a loading dock. This path can then be used at a later stage as the predefined path.

A vehicle state observer is used for estimating the position of the equivalent axle position 11 (Xp,Yp) of the last towed vehicle of the vehicle combination, in this case the virtual rear axle 9 of the second trailer (x3, y3). The vehicle state observer is using a vehicle model in combination with sensor inputs corresponding to the steering wheel angle, the yaw rate of the towing vehicle, wheel speeds of towing vehicle and towed vehicles, articulation angles of each articulation joint, and a position signal from e.g. a global positioning system. By using a GPS system having two spaced-apart antennas, also the heading for the towing vehicle can be obtained. The vehicle state observer can be realised by either a pure model based observer with updated information or by using e.g. a Kalman filter. The state space equations describing the state of a vehicle combination with two trailers could be expressed as in the following equations. In this example with two towed vehicles, Xp=x3 and Yp=y3.

$$\dot{x}_3 = v_1 \cos\phi_1 \cos\phi_2$$

$$\left(1 - \frac{C_1}{L_{eq,1}}\tan\phi_1\tan\delta + \frac{C_2}{L_{eq,2}}\tan\phi_1\tan\phi_2 + \frac{C_1 C_2}{L_{eq,1}L_{eq,2}}\tan\phi_2\tan\delta\right)\cos\theta_3$$

$$\dot{y}_3 = v_1 \cos\phi_1 \cos\phi_2 \left(1 - \frac{C_1}{L_{eq,1}}\tan\phi_1\tan\delta + \right.$$

$$\left. \frac{C_2}{L_{eq,2}}\tan\phi_1\tan\phi_2 + \frac{C_1 C_2}{L_{eq,1}L_{eq,2}}\tan\phi_2\tan\delta\right)\sin\theta_3$$

$$\dot{\theta}_3 = v_1 \left(-\frac{1}{L_{eq,3}}\cos\phi_1\sin\phi_2 + \frac{C_1}{L_{eq,1}L_{eq,3}}\sin\phi_1\sin\phi_2\tan\delta + \right.$$

$$\left. \frac{C_2}{L_{eq,2}L_{eq,3}}\sin\phi_1\cos\phi_2 + \frac{C_1 C_2}{L_{eq,1}L_{eq,2}L_{eq,3}}\cos\phi_1\cos\phi_2\tan\delta\right)$$

$$\dot{\phi}_1 = v_1 \left(-\frac{1}{L_{eq,1}}\tan\delta - \frac{1}{L_{eq,2}}\sin\phi_1 - \frac{C_1}{L_{eq,1}L_{eq,2}}\cos\phi_1\tan\delta\right)$$

$$\dot{\phi}_2 = v_1 \left(\frac{1}{L_{eq,2}}\sin\phi_1 + \frac{C_1}{L_{eq,1}L_{eq,2}}\cos\phi_1\tan\delta - \right.$$

$$\frac{1}{L_{eq,3}}\cos\phi_1\sin\phi_2 + \frac{C_1}{L_{eq,1}L_{eq,3}}\sin\phi_1\sin\phi_2\tan\delta +$$

$$\left. \frac{C_2}{L_{eq,2}L_{eq,3}}\sin\phi_1\cos\phi_2 + \frac{C_1 C_2}{L_{eq,1}L_{eq,2}L_{eq,3}}\cos\phi_1\cos\phi_2\tan\delta\right)$$

By using the equivalent axle position (XP,YP) and the effective wheelbase ($L_{eq,1}$) for each towed vehicle and the heading $\theta_n$ of the last $n^{th}$ towed vehicle and the articulation angles $\varphi'$ of each articulated joint of the vehicle combination, all the positions of the equivalent axles can be calculated by:

$$x_{n-1} = L_{eq,n} \cos\theta_n + C_{(n-1)} \cos\theta_{n-1}$$

$$y_{n-1} = L_{eq,n} \sin\theta_n + C_{(n-1)} \sin\theta_{n-1}$$

Figure 3:
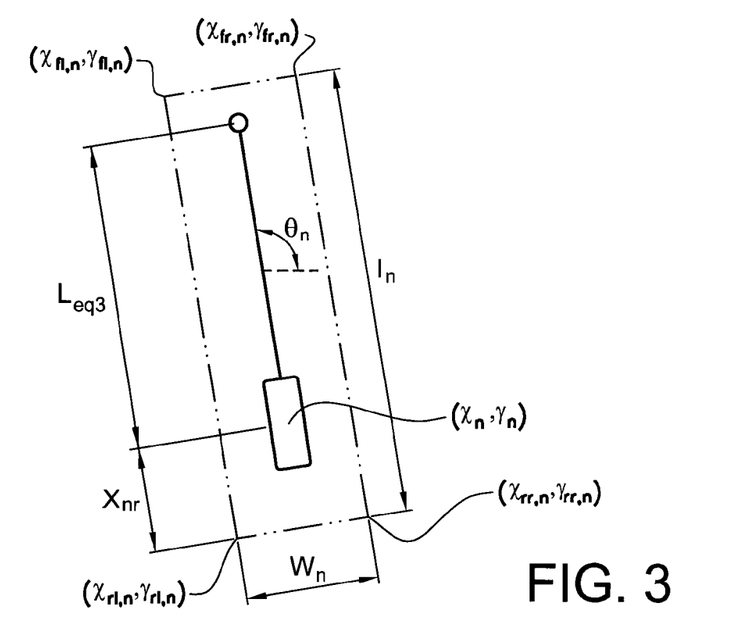
FIG. 3 shows an example of a vehicle model.

From these axle positions, the swept area of the articulated vehicle can be calculated from the vehicle dimensions. The vehicle dimensions of each vehicle are preferably stored in a memory in the towing vehicle. A model of a single vehicle is shown in FIG. 3. The corners of each vehicle are found from the equations:

$$x_{rl,n} = x_n - x_{nr}\cos\theta_n - \frac{w_n}{2}\sin\theta_n$$

$$x_{rr,n} = x_n - x_{nr}\cos\theta_n + \frac{w_n}{2}\sin\theta_n$$

$$x_{fl,n} = x_n + (l_n - x_{nr})\cos\theta_n - \frac{w_n}{2}\sin\theta_n$$

$$x_{fr,n} = x_n + (l_n - x_{nr})\cos\theta_n + \frac{w_n}{2}\sin\theta_n$$

$$y_{rl,n} = y_n - x_{nr}\sin\theta_n + \frac{w_n}{2}\cos\theta_n$$

$$y_{rr,n} = y_n - x_{nr}\sin\theta_n - \frac{w_n}{2}\cos\theta_n$$

$$y_{fl,n} = y_n + (l_n - x_{nr})\sin\theta_n + \frac{w_n}{2}\cos\theta_n$$

$$y_{fr,n} = y_n + (l_n - x_{nr})\sin\theta_n - \frac{w_n}{2}\cos\theta_n$$

From this, the area covered by each vehicle at each position is obtained. The areas of each vehicle are combined to an area covered by the vehicle combination at each position. From this, the swept area for the complete specified path traveled by the articulated vehicle is obtained. The swept area for the specified path can be used for a direct reversal of the articulated vehicle or it can be saved for a later use. A direct reversal may e.g. be performed when the driver has driven into a road by mistake or when the road is blocked and it is not possible or unpractical to turn the vehicle around.

Figure 4:
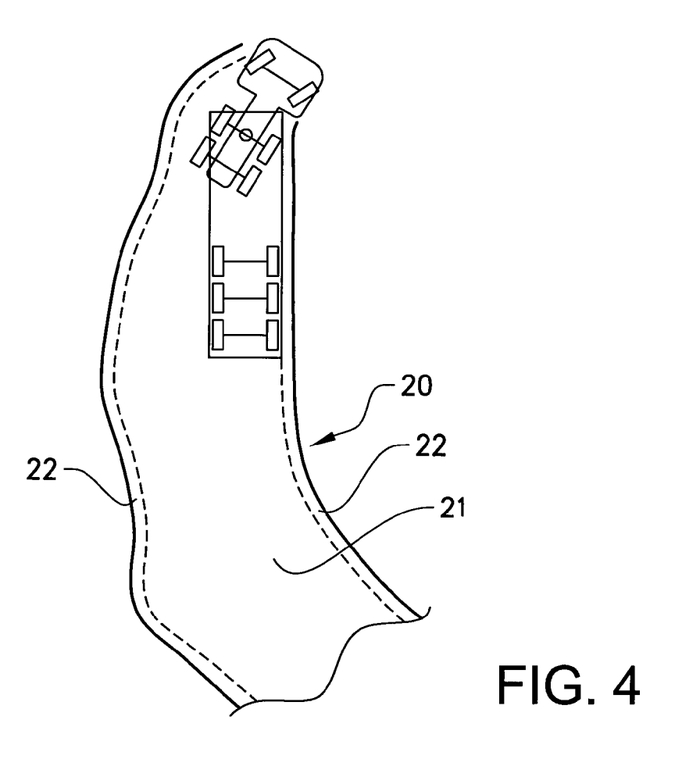
FIG. 4 shows a schematic swept area for an articulated vehicle combination.

Before the direct reversal of the vehicle combination, a tolerance band can be added to each side of the swept area, thereby obtaining a modified swept area. FIG. 4 shows a vehicle combination with the modified swept area 20 for the last part of a traveled path. In FIG. 4, the modified swept area 20 is comprised of the swept area 21 and the tolerance bands 22, one on each side of the swept area 21. The purpose of the tolerance band is to compensate for tolerances in the steering actuator and for tolerances and noise in the measured values from different sensors. Part of the tolerances in the steering actuator is dependent on the reversal speed.

It is possible to set the tolerance band to zero, i.e. to use the calculated swept area for the reversal. However, by allowing the vehicle to extend outside of the swept area at some points by a small measure, it is possible to use a relatively high reversal speed. In this way, the vehicle will substantially not extend outside the swept area. The meaning of substantially is defined by the tolerance band. It is thus of advantage to use a tolerance band in the order of less than 20 cm and preferably less than 10 cm on each side of the swept area. Preferably each tolerance band is less than $1/10$ of the width of the vehicle combination. The modified swept area is used to control the steering of the vehicle combination when reversing the vehicle combination along the specified path, such that the vehicle combination does not extend outwards of the modified swept area during the reversal.

With the added tolerance bands, the vehicle combination can be controlled such that it is within the modified swept area during the complete reversal of the specified path. If the specified path is the last path traveled by the vehicle combination, the driver can be ensured that he can reverse along the specified path without running into any obstacles, since he knows that he has just traveled the same path. Has the driver e.g. driven into a narrow road by mistake, he can reverse along the same road and be confident that he is within the road at all times. At the same time, the driver must of course be careful to observe any moving obstacles that may enter the traveled path behind the vehicle. This saves time and relieves the driver of a lot of stress, both from the reversing itself and from keeping the vehicle combination on the road. Especially for a relatively long and/or curved road, this is of advantage.

Preferably, the projection of the vehicle combination in the tolerance band of the modified swept area is minimized during the reversal. Depending on different parameters, such as reversal speed, the steering actuator, the used sensors etc, the projection of the vehicle combination can be allowed more or less in the tolerance band. It is preferred to minimize the total area projected in the tolerance band since this will give a smoother reversal. However, it is impractical to avoid any projection in the tolerance band during the complete reversal. The width of the tolerance band is set such that a reasonable reversing speed can be used but where the width of the tolerance band is narrow enough to give a good tolerance to obstacles around the vehicle.

It is also possible to save the swept area in a memory for later use. When the swept area is saved in a memory, it can also be used to verify that a similar vehicle combination, e.g. a vehicle combination comprising a semitrailer with a different effective wheelbase (Leq,i), will be able to reverse along the same path at a different moment. Depending on the other vehicle using the same swept path, the tolerance band of the modified swept path may be dependent on the vehicle combination itself. A vehicle combination that is similar may use a relatively small tolerance band and a more different vehicle combination may use a larger tolerance band. The swept area can either be stored in a memory in the specific vehicle or in a central database where different vehicles can access the information. In this way, also vehicles that have not been at a specific position before can use a swept area at a specific position for a reversal.

The recording of a specified path can also be automated, e.g. at specific locations. One example is when a driver is at an identified loading/unloading area. At this location, all the paths traveled by a vehicle combination, both forwards and backwards, are recorded and a swept area is calculated each time. The swept areas are combined for all moments which make it possible to utilize the total recorded swept area of that location for planning a new reversal path for any vehicle combination. The calculated swept areas may be stored in each individual vehicle combination or may be stored at a central station, e.g. at a central location Preferably, the last part of a traveled path is always recorded by using a rolling buffer which always store position points for a certain distance, such as for the last kilometer. By using such a rolling buffer to record the traveled path, it is assured that the driver always can use this as an immediate "undo" button by selecting the latest recorded path.

Figure 5:
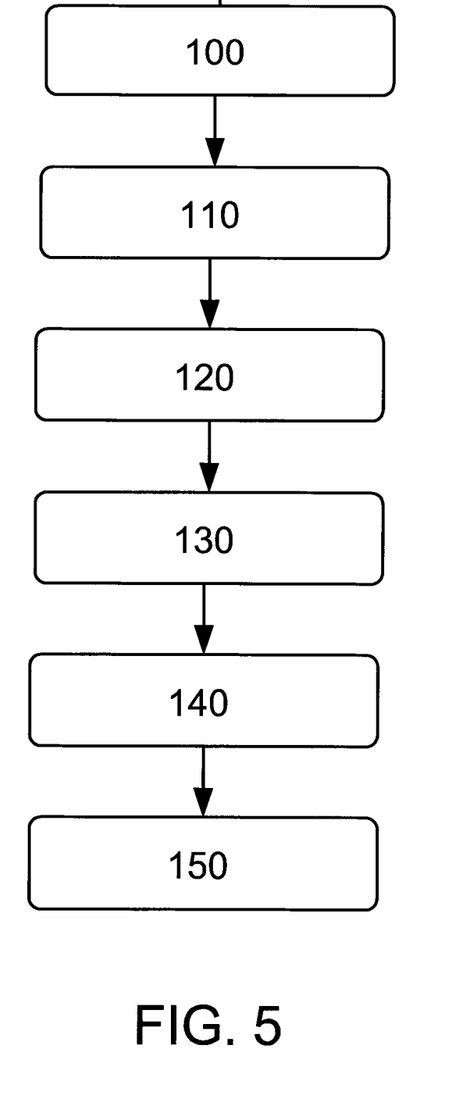
FIG. 5 shows a schematic flow chart of an inventive method for assisting the reversal of an articulated vehicle combination.

FIG. 5 shows a schematic flow chart of the method for assisting the reversal of a vehicle combination comprising a towing vehicle and at least one towed trailer. The method steps are preferably performed by a computer program and a computer program product contained and run in an electronic control system of the vehicle.

In step 100, positions of the vehicle are recorded for a specified path, e.g. part of a route traveled by the vehicle. The number of positions that are recorded can be selected, but includes preferably the last part of the traveled path. In one example, the last kilometer of the traveled path is recorded in a rolling buffer. The position representing the position of the vehicle is preferably the position of the virtual rear axle, the equivalent axle position, of the last towed vehicle.

In step 110, other values representing the forward travel of the vehicle combination along the specified path are recorded at the predefined number of positions. Those values are the heading of the articulated vehicle and the articulation angle of each articulation joint of the articulated vehicle combination.

In step 120, the recorded values for the specified path are saved in a memory.

In step 130, the swept area of the first vehicle is calculated for the specified path by using the recorded values and size information of the articulated vehicle combination. The size information for each vehicle is preferably stored in the control unit of the towing vehicle.

In step 150, the swept area is used to control the steering of the towing vehicle when reversing the articulated vehicle along the specified path, such that the articulated vehicle does not extend outwards of the swept area during the reversal.

Alternatively, in step 140, a tolerance band is added to each side of the calculated swept area such that a modified swept area is obtained. In this case, the modified swept area is used in step 150 to control the steering of the towing vehicle when reversing the articulated vehicle along the specified path, such that the articulated vehicle does not extend outwards of the modified swept area during the reversal.

The invention is not to be regarded as being limited to the embodiments described above, a number of additional variants and modifications being possible within the scope of the subsequent patent claims.

REFERENCE SIGNS

1: Vehicle combination
2: Truck
3: Dolly
4: Semitrailer
5: Trailer coupling
6: Dolly virtual axle
7: Dolly axles
8: King pin
9: Semitrailer virtual axle
10: Semitrailer axles
11: Equivalent axle position
20: Modified swept area
21: Swept area
22: Tolerance band

The invention claimed is:

1. A method for assisting the reversal of an articulated vehicle, comprising:
recording a predefined number of positions for a first articulated vehicle when moving forward along a specified path,
recording an articulation angle of each articulation joint of the articulated vehicle at the predefined number of positions,
recording a heading for the towing vehicle of the articulated vehicle at the predefined number of positions,
saving the recorded values for the specified path in a memory,
calculating a swept area of the first vehicle for the specified path by using the recorded values and size information of the articulated vehicle,
using the swept area to control the steering of the towing vehicle when reversing the articulated vehicle along the specified path, such that the articulated vehicle does not extend outwards of the swept area during the reversal.

2. Method according to claim 1, wherein the swept area for the specified path is stored in a memory.

3. Method according to 2, wherein the memory is located in a central database.

4. Method according to claim 1, wherein the specified path is a last part of a route traveled by the articulated vehicle.

5. Method according to claim 1, wherein the swept area for the specified path is used by a second articulated vehicle having a different wheel base to control the steering of that vehicle when reversing along the specified path, such that the second articulated vehicle does not extend outwards of the swept area or the modified swept area during the reversal.

6. Method according to claim 1, wherein several swept areas at the same location are combined to create an aggregate swept area for that location.

7. Method according to claim 1, characterized in that the speed of the reversal of the articulated vehicle is controlled by the driver.

8. Method according to claim 1, wherein the speed of the reversal of the articulated vehicle is automatically controlled by the vehicle control system.

9. Method according to claim 1, wherein the maximum allowed speed during reversal is limited to a predefined speed value.

10. Method according to claim 1, wherein the specified path is defined by the driver by setting a start point and an end point for the specified path.

11. A computer comprising program for performing all the steps of claim 1, the program being stored on a non-transitory computer readable storage medium, when the program is run on the computer.

12. A computer program product comprising program code stored on a non-transitory computer readable medium for performing all the steps of claim 1 when the program product is run on a computer.

13. A method for assisting the reversal of an articulated vehicle, comprising:
recording a predefined number of positions for a first articulated vehicle when moving along a specified path,
recording an articulation angle of each articulation joint of the articulated vehicle at the predefined number of positions,
recording a heading for the towing vehicle of the articulated vehicle at the predefined number of positions,
saving the recorded values for the specified path in a memory,
calculating a swept area of the first vehicle for the specified path by using the recorded values and size information of the articulated vehicle,
using the swept area to control the steering of the towing vehicle when reversing the articulated vehicle along the specified path, such that the articulated vehicle does not extend outwards of the swept area during the reversal,
wherein the specified path is a predefined path traveled at an earlier moment and saved in a memory.

14. A method for assisting the reversal of an articulated vehicle, comprising:
recording a predefined number of positions for a first articulated vehicle when moving along a specified path,
recording an articulation angle of each articulation joint of the articulated vehicle at the predefined number of positions,
recording a heading for the towing vehicle of the articulated vehicle at the predefined number of positions,
saving the recorded values for the specified path in a memory,
calculating a swept area of the first vehicle for the specified path by using the recorded values and size information of the articulated vehicle,
using the swept area to control the steering of the towing vehicle when reversing the articulated vehicle along the specified path, such that the articulated vehicle does not extend outwards of the swept area during the reversal,
wherein a tolerance band is added to each side of the swept area such that a modified swept area is obtained, where the modified swept area is used to control the steering of the towing vehicle when reversing the articulated vehicle along the specified path, such that the articulated vehicle does not extend outwards of the modified swept area during the reversal.

15. Method according to claim 14, wherein the tolerance band is less than 1/10 of the width of the articulated vehicle.

16. Method according to claim 14, wherein the tolerance band is less than 20 cm.

17. Method according to claim 14, wherein the tolerance band is less than 10 cm.

18. Method according to claim 14, wherein the projected area of the articulated vehicle in the tolerance band of the modified swept area is minimized during the reversal.

* * * * *